US012682051B2

(12) United States Patent
Kim et al.

(10) Patent No.: US 12,682,051 B2
(45) Date of Patent: Jul. 14, 2026

(54) CONTROL SYSTEM HAVING ISOLATED USER COMPUTING UNIT AND CONTROL METHOD THEREFOR

(71) Applicants:Deok Woo Kim, Seoul (KR); WOORI TECHNOLOGIES CORPORATION, Seoul (KR)

(72) Inventors: Deok Woo Kim, Seoul (KR); Jung Woo Park, Seoul (KR)

(73) Assignees: WOORI TECHNOLOGIES CORPORATION, Seoul (KR); Deok Woo Kim, Seoul (KR)

( * ) Notice: Subject to any disclaimer, the term of this patent is extended or adjusted under 35 U.S.C. 154(b) by 282 days.

(21) Appl. No.: 18/034,179

(22) PCT Filed: Mar. 24, 2021

(86) PCT No.: PCT/KR2021/003672
§ 371 (c)(1),
(2) Date: Apr. 27, 2023

(87) PCT Pub. No.: WO2022/203098
PCT Pub. Date: Sep. 29, 2022

(65) Prior Publication Data
US 2023/0409704 A1     Dec. 21, 2023

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

2008/0147271 A1* 6/2008 Breed ................. B60R 21/0132
701/36
2019/0001964 A1* 1/2019 Lin ....................... B60W 50/14
(Continued)

FOREIGN PATENT DOCUMENTS

JP         2006-094480 A      4/2006
JP         2008-152562 A      7/2008
(Continued)

OTHER PUBLICATIONS

International Search Report for PCT/KR2021/003672 dated Dec. 3, 2021 [PCT/ISA/210].

*Primary Examiner* — Ario Etienne
*Assistant Examiner* — Mohammad Yousuf A. Mian
(74) *Attorney, Agent, or Firm* — Sughrue Mion, PLLC

(57) ABSTRACT

A control system for monitoring and taking action on security, abnormal situations, abnormal operations, and the like in various fields is disclosed. The present control system includes a user computing unit and a secure computing unit. The user computing unit includes its own CPU and generates control information by executing a user program. The secure computing unit includes its own CPU and again checks input information inputted from a device to be controlled and the control information generated by the user computing unit to generate system check information. The system check information is compared with system state determination standard information preset by a user, and when the system state is within a normal range, the control information is outputted as it is, and when the system state is not within the normal range, the user takes a preset appropriate security action.

10 Claims, 4 Drawing Sheets

(56)                    References Cited

U.S. PATENT DOCUMENTS

| 2019/0003839 | A1* | 1/2019 | Hu | G06F 16/29 |
| 2021/0141894 | A1* | 5/2021 | Kim | G06F 21/85 |

FOREIGN PATENT DOCUMENTS

| JP | 2018-526691 | A | 9/2018 |
| JP | 2020-520037 | A | 7/2020 |
| KR | 10-2017-0013513 | A | 2/2017 |
| KR | 10-2018-0123815 | A | 11/2018 |
| KR | 10-2021-0115822 | A | 9/2021 |

* cited by examiner

100 — USER COMPUTING UNIT

CPU

200 — SECURITY COMPUTING UNIT

CPU

300 — CONTROL INPUT/OUTPUT UNIT

400 — DEVICE TO BE CONTROLLED

CONTROL SYSTEM HAVING ISOLATED USER COMPUTING UNIT AND CONTROL METHOD THEREFOR

CROSS REFERENCE TO RELATED APPLICATIONS

This application is a National Stage of International Application No. PCT/KR2021/003672 filed Mar. 24, 2021.

TECHNICAL FIELD

The present invention relates to computer hardware and software technology for improving the stability and robustness of control systems used in fields such as vehicles, robots, railways, aerospace, plants, and the like.

BACKGROUND ART

In control systems used in various fields such as vehicles, robots, railways, aerospace, plants, and the like, a control program is generally executed in a computer having a central processing unit (CPU), a memory, an input/output (I/O) device, etc., and monitors and controls the whole devices, systems, or plants to be controlled. Therefore, if a control program erroneously operates, the devices, systems, or plants to be controlled may stop or abnormally operate, resulting in loss of lifetime or enormous financial damage.

In general, a computer used in a control device may be connected to a plurality of other control devices connected through a communication network for distributed control or continuous operation, but is structurally very similar to a general-purpose computer. Such devices have a structure in which an operating system (OS) and basic programs generally execute the control programs.

However, recently, as autonomous or automatic driving technology, to which artificial intelligence (AI) is employed, has been applied to vehicles, drones or the like, problems with the stability of control devices or systems have begun to emerge. Further, there have been cases in which control devices or systems have been hacked or the control authority thereof has been transferred to malicious persons for other reasons.

As an example, accidents like the September 11 terrorist attacks and the disappearance of the Malaysian aircraft will be considered. Generally, aircraft control systems are designed with the pilot's good intentions in mind. However, in both of those cases, the pilot intentionally crashed the aircraft into a building with malice or managed to crash the aircraft without being caught on radar. At the time of the September 11 terrorist attacks, the aircraft control system would have had sufficient information to know that, if the aircraft continued to fly in this state it would collide with a building, and it would have warned the pilot in various ways. In addition, in the event of the Malaysian aircraft disappearance, the aircraft control system would have had sufficient information to determine that the aircraft had deviated from its route, and it would have notified the pilot in various ways. However, the already malicious pilots may have ignored the warnings from the control systems, and ultimately, the aircraft unfortunately crashed or disappeared.

As another example, in the case of an autonomous driving car controlled by AI, problems may occur due to hacking, driving off a route due to unexpected abnormal behavior of AI algorithms, or other unintended or unsuitable behaviors. That is, if an autonomous driving control device completely stops or malfunctions due to either an abnormality of AI algorithms or a hacking and does not respond to the driver's command, the car may have an accident and in the worst case, an occupant may die.

However, generally, in a control device or control system, a correlation between an input and an output is identified to partially compensate for a malfunction using a method such as interlocking. For example, in the case in which the operation of the device is designed, it is designed such that, when valve A and valve B should not be opened simultaneously, actuator signals of valve A and valve B are interlocked to prevent the two valves from being opened simultaneously. Further, in the case of a control device or control system, malfunction in the case of a hardware abnormality is prevented using redundancy or voting technology. Redundancy is a method in which, in the case of failure of a main system, a standby subsystem operates immediately and continues the operation without interruption, and is for preventing malfunction of the entirety of the system due to failure in one system. Voting is a method of managing one input/output signal or one piece of information through multiple paths, and is, for example, a method of reading one input signal through three different paths and "voting" by a majority vote (e.g., 3:0, 2:1, etc.) to determine an input value.

However, since such a malfunction prevention method assumes the driver's good intention or a normally operating AI autonomous driving control device, abnormal operations in which the driver or the AI autonomous driving control device misuses normal functions and makes abnormal execution results (output signals) cannot be prevented.

DISCLOSURE

Technical Problem

The present invention is to overcome the above-described problems, proposing a new architecture of a stable and robust control device and control system applicable to various fields. The control architecture proposed in the present invention can prevent abnormal operations that make abnormal execution results (output signals) through misuse of normal functions by artificial intelligence (AI) or control system operators and can respond immediately, thereby significantly improving the stability of the entire device or system.

Technical Solution

One aspect of the present invention provides a control system having an isolated user computing unit, which includes a user computing unit, a security computing unit, a communication interface, and a control input/output unit. The user computing unit may include a central processing unit (CPU), a memory, peripheral circuits, and the like, execute a user program (i.e., control program), and generate preliminary control information (control signal for controlling a device to be controlled), by using a control algorithm, input information, and other system state information. Here, the input information may be information read by the security computing unit from the control input/output unit, and may be provided to the user computing unit through the communication interface; the system state information may be generated by itself or may be provided by the security computing unit.

The security computing unit may include other components such as a different CPU, a memory, peripheral circuits, and the like, and provide input information, which is input from the device to be controlled through the control input/ output unit, to the user computing unit through the communication interface. Further, the security computing unit may drive a security program, receive the preliminary control information generated by the user computing unit through the communication interface, analyze the information, such as input information, system state information, control algorithm, and the like, together with user setup information, and generate system check information. The system check information may be compared with system state determination standard information preset by a user. The preliminary control information may be directly output to the control input/output unit as control information, when the system state is within a normal range; and whereas a security action preset by the user may be taken, when the system state is not within the normal range. The user computing unit and the security computing unit may communicate with each other through the communication interface, and the control input/ output unit may be connected only to the security computing unit. The control input/output unit may be configured to process physical input/output signals, and in this case, the control input/output unit may be configured to perform the same function as a digital input/output module or an analog input/output module for a programmable logic controller (PLC). Further, the control input/output unit may be formed of a data communication device and connected to a communication port of the device to be controlled. In this case, the input/output information may be transmitted or received according to the communication protocol. Meanwhile, the communication interface may be implemented by combining a circuit that directly connects CPUs with high-speed communication, a dual port random-access memory (DPRAM) or a data register, which is connected to each system bus, logic circuits connected to each other by interrupt signals, and the like.

The security computing unit of the control system according to the present invention may include a security input/ output unit. The security input/output unit may be configured to process physical input/output signals, and in this case, may be configured to perform the same function as a digital input/output module or an analog input/output module of a PLC. Alternatively, the security input/output unit may be formed of a data communication device so as to be connected to a communication port of the security control device. In this case, it is possible for a third party or institution entrusted with control authority in an emergency to control the entire system by a state of the entire system being reported to the third party or institution using the security input/output unit, or by issuing commands to the security computing unit using the security control device and downloading programs for emergency response.

As described above, the security computing unit may execute the security program to record data and signals input from or output to the user computing unit, and continuously monitor and analyze the data and signals, thereby preventing the user computing unit from operating out of the normal range and damaging the stability of the entire system. More specifically, the security computing unit may serve to take an appropriate security action or restore the system to a normal state by controlling a result of the control operation of the user computing unit when the stability of the system is likely to be damaged, while tracking the result of the control operation of the user computing unit.

Meanwhile, the following is an explanation of the steps in the operation performed in the control system of the present invention:

An input information providing operation in which the security computing unit provides input information read from the control input/output unit to the user computing unit through the communication interface;

A control calculation operation in which the user computing unit generates preliminary control information by performing control operation using a control algorithm, the input information, and system state information, under the execution of a control program;

A preliminary control information receiving operation in which the security computing unit receives the preliminary control information from the user computing unit, using the communication interface;

A system check information deriving operation in which the security program of the security computing unit derives the system check information using the preliminary control information, the control algorithm, the input information, the system state information, and user setup information of the user computing unit;

A system state determining operation in which the security computing unit compares the system check information with system state determination standard information set by the user;

A final control information providing operation in which the security computing unit provides the preliminary control information, as final control information, to the control input/output unit when it is determined that the system state is within the normal range in the system state determining operation; and A security action executing operation in which the security computing unit executes a security control program preset by the user when it is determined that the system state is not within the normal range in the system state determining operation.

Additionally, the security action executing operation may include a security information providing operation in which the security input/output unit selectively provides the user setup information, the system check information, the system state information, the input information, the control information, and the like to the security control device, and a security command applying operation in which the security control device applies or issues the security command to the security computing unit through the security input/output unit, on the basis of the provided information.

Above, the operations were described separately to help conceptual understanding. However, because in general the response speed of actuators and sensors is much slower than that of the computer operation, there is no major problem in taking a security action even when the above operations are performed only once while control input/output is performed several times (i.e., after the input information is provided to the user computing unit through the security computing unit a predetermined number of times in the input information providing operation, subsequent operations are performed), instead of performing subsequent operations whenever there is control input/output (i.e., whenever the input information is provided to the user computing unit through the security computing unit in the input information providing operation). That is to say, it is possible to implement such method so that the security computing unit provides the preliminary control information received from the user computing unit as the control information immediately after receiving the preliminary control information, and then periodically performs the above operations. In the case such operations are performed, if there is no problem the same control information is output twice in succession as a result, but as described above, there is no problem at all, because the reaction speed of the devices to be controlled is much slower than that of the computer and the past values and the current values of the control information are related to each other.

In addition, the calculation performed in the system check information deriving operation may be done in different ways to increase the accuracy of the calculation result or may be performed in a parallel manner to reduce calculation time. That is, the results may be verified by comparing the preliminary control information, generated by the security computing unit, with the preliminary control information, generated and provided by the user computing unit in the same manner as the control calculation operation performed by the user computing unit, and then the calculation operations may be modified in such a way that the security program of the security computing unit forms system check information using the control algorithm, the input information, the system state information, and the user setup information. Alternatively, the calculation time may be shortened in such a way that the security computing unit performs calculation procedures in parallel that do not require the preliminary control information provided by the user computing unit, and the user computing unit provides the preliminary control information and then performs the remaining calculation procedures. Further, the system state information may include past values of information representing the system state.

The configuration and operation of the present invention introduced above will become clearer through specific embodiments to be described below with reference to the accompanying drawings.

Advantageous Effects

In control devices or control systems used in various fields such as vehicles, robots, railways, aerospace, plants, and the like, a control program is generally executed in a computer for control use which may be composed of a central processing unit (CPU), a memory, an input/output (I/O) device, etc., and monitors and controls the whole target devices or systems/plants. Therefore, if the control program operates incorrectly, the entire device or system to be controlled can stop or operate abnormally, resulting in loss of lifetime or enormous financial damage. The control architecture proposed in the present invention can prevent abnormal operations that make abnormal execution results (output signals) from misuse of normal functions by artificial intelligence (AI) or control system operators and can respond immediately, thereby significantly improving the stability of the entire device or system.

That is, according to an isolated user computing unit with the same architecture as that of the present invention, if a system function stops or operates abnormally due to a wrong judgment of a control program running in the isolated user computing unit, the abnormality can be constantly checked by the security computing unit and, in the case of abnormal operation, the input/output device can be directly controlled, and then the system can stably run by.

MODES OF THE INVENTION

Hereinafter, embodiments in which the spirit of the present invention introduced above is specifically implemented will be described. However, the technical scope of the present invention is not limited to the embodiments and accompanying drawings described below. The scope of the present invention is determined by rational interpretation of the appended claims.

The present invention is a technology basically newly expanded to apply a computer architecture proposed in Prior Publication Patent No. 10-2018-0123815 in Korea (Title: Computer with isolated user computing unit) of the present inventor (Kim Deok-woo) to a control system. In the prior published patent, a user computing unit is isolated from an input/output device and input/output is performed through a security management computing unit (a similar concept to the security computing unit of the present invention).

The present invention proposes a specific novel method and structure for expanding and applying the prior published patent to a control system in order to improve the stability and robustness of the control system.

Figure 1:
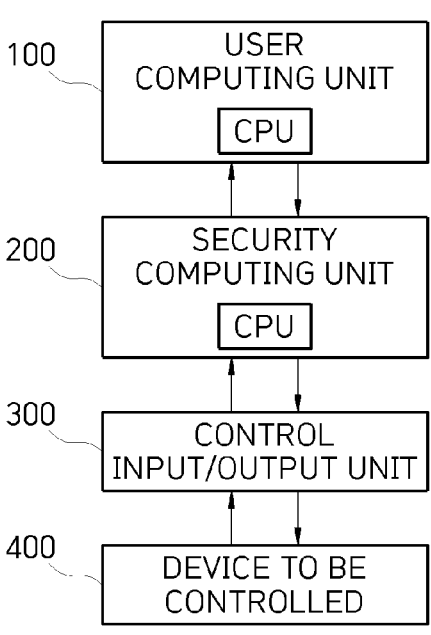
FIG. 1 is a conceptual configuration diagram of a control system according to the present invention.

FIG. 1 is a conceptual configuration diagram of a control system having an isolated user computing unit according to the present invention.

The control system of the present invention includes a user computing unit 100 and a security computing unit 200 each having a dedicated central processing unit (CPU). Here, a device to be controlled 400 encompasses specific devices constituting the control system, and may be implemented differently depending on an application target of the control system, but basically either directly inputs/outputs electrical signal, or data including the electrical signal, or is connected to a control input/output unit 300 through a certain communication device. Also, a plurality of devices to be controlled 400 may be connected to the control input/output unit 300. For example, in the case of a self-driving or autonomous driving car, a driving device, a steering device, a driving assistance device, etc. are connected to the control input/output unit 300, and artificial intelligence (AI) programs and data responsible for autonomous driving are managed and executed by the user computing unit 100. According to the present invention, the user computing unit 100 is isolated from the device to be controlled 400 and the control input/output unit 300. Similar to the related art, the user computing unit 100 has its own CPU and executes a user program (i.e., control program) for controlling the device to be controlled 400. That is, information (input information which will be described below) such as a state signal and a sensor detection signal of the device to be controlled 400 is processed to output a signal for controlling the device to be controlled 400, and in the case of a vehicle, control signals (i.e., control information) such as acceleration signals, deceleration signals, attitude control signals, and braking signals are generated.

The security computing unit 200 has an independent dedicated CPU and executes a security program. That is, the security computing unit 200 relays input/output of data between the device to be controlled 400 and the user computing unit 100 or performs a security action preset by the user on the device to be controlled 400. Specifically, the security computing unit 200 records data and signals input from or output to the user computing unit 100, continuously monitors and analyzes the data and signals, and thus prevents the user computing unit 100 from damaging the stability of the entire system by operating out of the normal range. That is, the security computing unit 200 tracks a result of the control operation of the user computing unit 100, and, if the stability of the system is likely to be damaged, controls the user computing unit 100, so as to take an appropriate security action or restore the system to the normal state.

Figure 2:
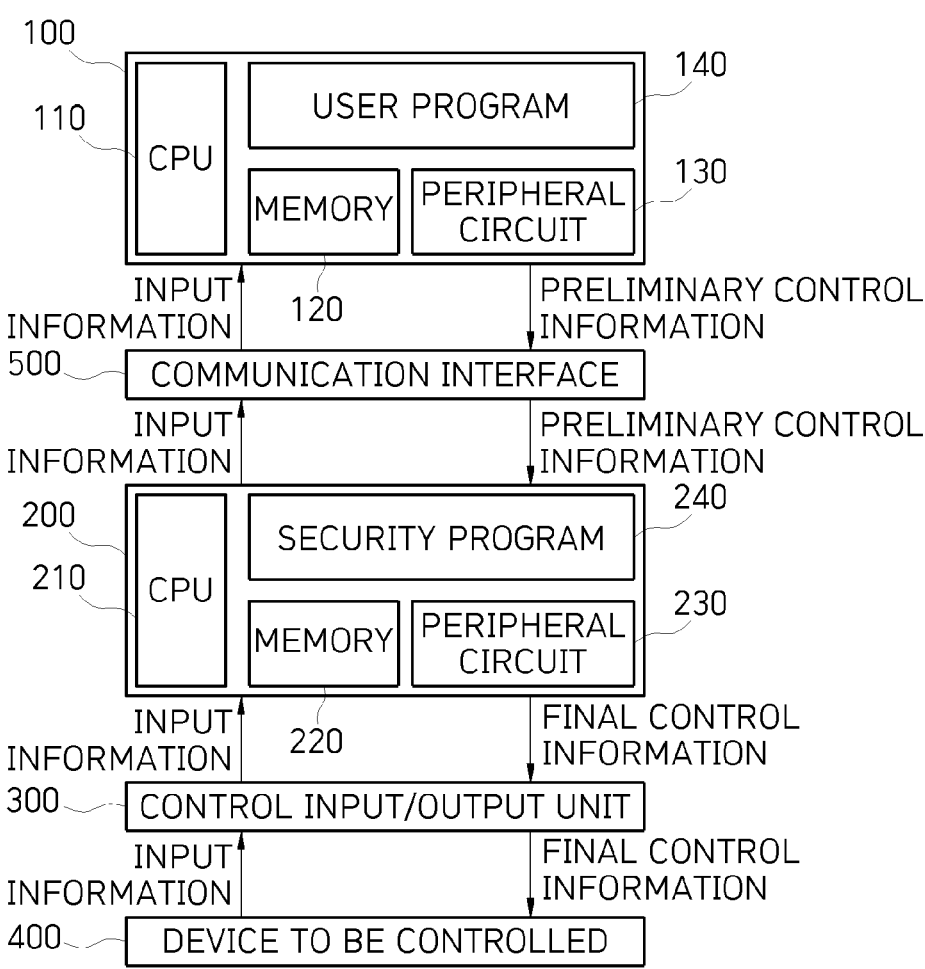
FIG. 2 is a specific configuration diagram of the control system according to the present invention.

FIG. 2 is a specific configuration diagram for implementing the concept of the control system illustrated in FIG. 1.

The user computing unit 100 is composed of a CPU 110, a memory 120, and other peripheral circuits 130, and executes a user program (i.e., control program) 140 to generate control information (a control signal) from input information and other pieces of system state information according to a control algorithm. In this case, the input information may be provided by a security computing unit 200 through a communication interface 500, and the system state information may be generated by the user computing unit 100 itself or provided by the security computing unit 200. As described above, the input information includes information, such as a state signal, a sensor detection signal and the like of the device to be controlled 400, which are received from the device 400; and the control information includes an output signal for controlling the device to be controlled 400, and for example in a vehicle, it may be a control signal such as an acceleration signal, a deceleration signal, a posture control signal, or a braking signal. However, since the control information made by the user computing unit 100 has not yet been finally determined to be transmitted to the device to be controlled 400 to control the device 400, the control information will be referred to as "preliminary control information."

Here, the communication interface 500 is responsible for communication between the user computing unit 100 and the security computing unit 200, and may be implemented as an electric circuit that directly connects the CPU 110 of the user computing unit 100 and a different CPU 210 of the security computing unit 200 through high-speed communication. Alternatively, the communication interface 500 may be implemented by combining a dual port random-access memory (DPRAM) or a data register, which is connected to each system bus, logic circuits connected to each other by interrupt signals, and the like.

The security computing unit 200 is composed of other independent components such as a CPU 210, a memory 220, and peripheral circuits 230. The CPU 210 executes a security program 240 and provides the input information, which is input from the device to be controlled 400 through a control input/output unit 300, to the user computing unit 100 through the communication interface 500. Further, the CPU 210 receives the preliminary control information, which is generated by the user computing unit 100 through the communication interface 500, and analyzes the input information, the system state information, control algorithm information, and user setup information together to generate system check information. The CPU 210 compares the system check information with system state determination standard information preset by a user, and when a state of the control system is within a normal range, outputs the preliminary control information directly to the control input/output unit 300 as control information, and when the state of the control system is not within the normal range, takes a security action preset by the user.

The control input/output unit 300 is not connected to the user computing unit 100 but is connected only to the security computing unit 200. The control input/output unit 300 may be configured to process physical input/output signals. In this case, the control input/output unit 300 may be configured to perform the same function as a digital input/output module or an analog input/output module of a programmable logic controller (PLC). Further, the control input/output unit 300 may be formed of a data communication device and connected to a communication port of the device to be controlled 400. In this case, the input/output information may be transmitted or received according to the communication protocol.

Figure 3:
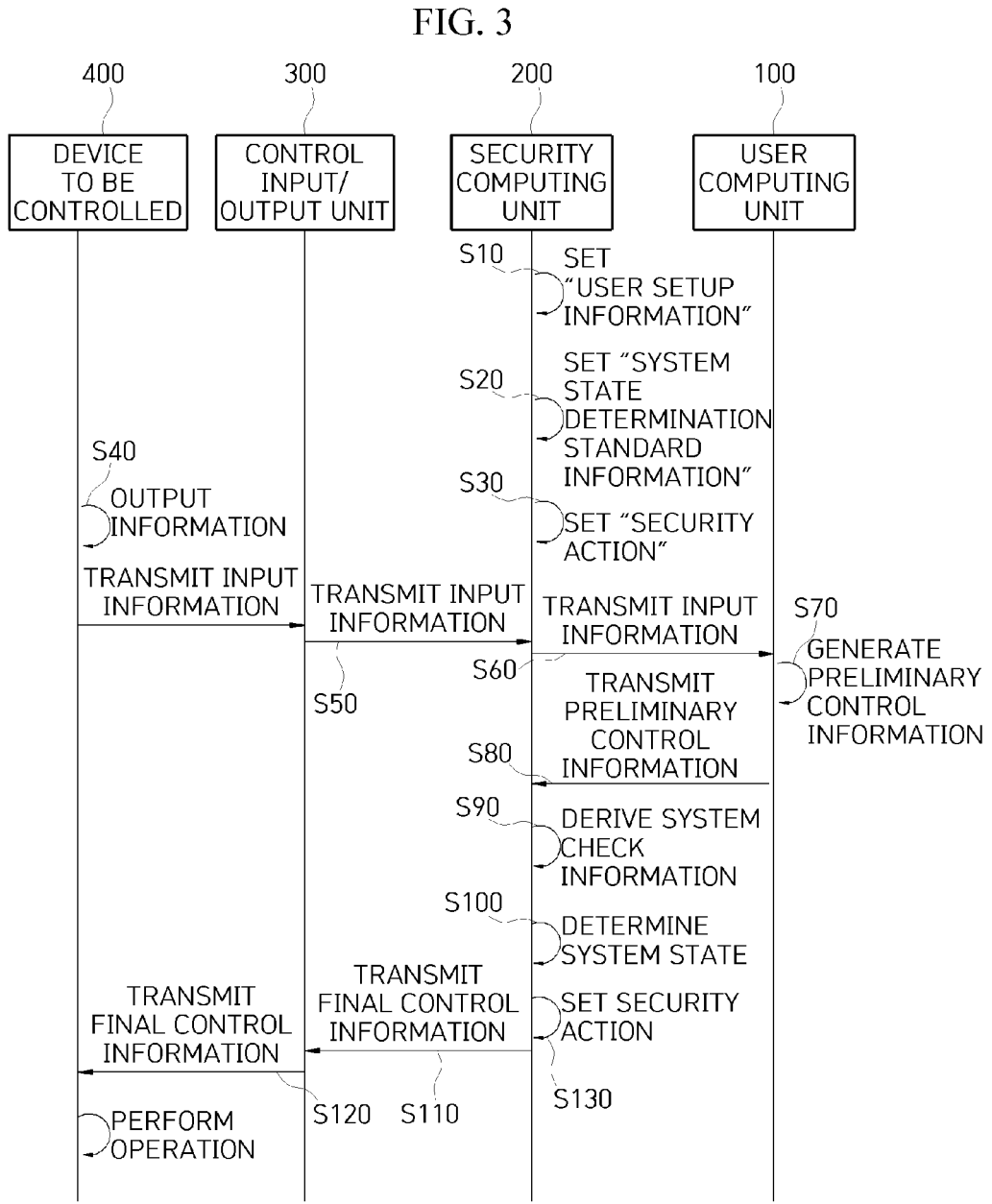
FIG. 3 is a process flowchart for describing the operation of the control system illustrated in FIG. 2.

FIG. 3 is a specific task processing flowchart of the control system having the isolated user computing unit illustrated in FIG. 2.

S10: First, the security computing unit 200 generates user setup information. The user setup information is used to derive system check information later and is set up by a user. The user setup information may include various types of information to be used for system state determination standard information. Further, examples of basic information may include an input/output limit value, an amount of communication data (traffic per hour), a composition and type of a communication data packet, a range of a communication target (peer, destination), a range of change of an output value per hour, interlocking constraints, a CPU temperature, etc.

In the case of a self-driving car, when a driving route is set, information on a driving route to a destination may be user setup information, and an allowable error when departing from the driving route, a maximum driving speed, an acceleration rate, a deceleration rate, a vehicle interval, etc. may also be the user setup information. Further, a security control program for safely parking and stopping a vehicle on the roadside when the vehicle is out of the driving route and a security situation occurs may also be the user setup information.

With the same concept, in the case of a passenger airplane, a flight route to the destination, an allowable error when departing from the flight route, a safety distance from front and rear obstacles, and the like may be the user setup information. Further, in the case of guide robots used in public facilities, an operation area, a moving speed, a safety distance from obstacles or humans, and the like may be the user setup information.

S20: In addition, the security computing unit 200 sets standard information (hereinafter, "system state determination standard information") for determining a system state of the device to be controlled 400. The system state determination standard information is set by the user as standard information for comparison with the system check information in order to determine the system state later. The system state determination standard information may be some or all pieces of the user setup information. S30: Further, the security computing unit 200 sets a security action to be taken when it is determined that the system state of the device to be controlled 400 is out of a normal range. The security action is also set by the user and may be generally set in the form of a security action program. For example, the security action may be to warn the pilot when the airplane deviates from the route and report to a control center on the ground through a security input/output unit 600 to be described below. Further, the security action may be to warn the pilot of the occurrence of a security situation when the airplane approaches a front obstacle within a minimum safe distance, ignore preliminary control information provided by the user computer, then automatically control the airplane using the control information generated according to the security control program set by the user as final output information to avoid the obstacle, and then wait for a follow-up command by reporting this situation to the control center on the ground while maintaining altitude.

S40: As described above, the device to be controlled 400 outputs information on a state signal and a signal detected by a sensor, and the information is transmitted to the security computing unit 200 as input information through the control input/output unit 300 (S50).

S60: The security computing unit 200 provides the received input information to the user computing unit 100. The input information is transmitted from the security computing unit 200 to the user computing unit 100 through the communication interface 500, as described in FIG. 2.

S70: The user computing unit 100 executes a user program (control program) for controlling the device to be controlled 400 using the received input information to generate preliminary control information. It has been described above that the preliminary control information is control information for controlling the device to be controlled 400 and is information that has not yet been determined. The control information may include both an output signal and communication data.

S80: The preliminary control information generated by the user computing unit 100 is transmitted to the security computing unit 200. Even in this case, the preliminary control information is transmitted from the user computing unit 100 to the security computing unit 200 through the communication interface 500 described in FIG. 2 (hereinafter, the description that data exchange between the user computing unit 100 and the security computing unit 200 is performed through the communication interface 500 is omitted).

S90: The security computing unit 200 executes the security program 240 to derive system check information using the user setup information, the input information received through the control input/output unit 300, a control algorithm, and the preliminary control information received from the user computing unit 100.

Here, the system check information may include various types of information associated with the user setup information. For example, in the case of a self-driving car, a current location of the car, a current speed of the car, history information reporting whether there was a case where a distance between cars was within a minimum safe distance, and acceleration/deceleration history information may be included. Separately, an input value, an output value, and communication data of the system, integrity information of an operating system of the user computing unit 100, integrity information of a control program of the user computing unit 100, a memory state (whether there is a checksum error, usage information, etc.) of the user computing unit 100, a CPU temperature, CPU usage of the user computing unit 100, the number of programs executed in the user computing unit 100, and the like may be included. The system check information may include not only a current state but also state changes over time.

The calculation in the system check information deriving operation may be performed in different ways to increase the accuracy of the calculation result or may be performed in parallel to shorten the calculation time. That is, in the same way as the control calculation operation performed by the user computing unit 100, the results may be verified by comparing the preliminary control information directly generated by the security computing unit 200 with the preliminary control information generated and provided by the user computing unit 100, and then the results may be modified in such a way that the security program of the security computing unit 200 forms system check information using the control algorithm, the input information, the system state information, and the user setup information. Alternatively, the calculation time may be shortened in such a way that the security computing unit 200 performs calculation procedures in parallel that do not require the preliminary control information provided by the user computing unit 100, and the user computing unit 100 provides the preliminary control information and then performs the remaining calculation procedures.

S100: The security computing unit 200 compares the derived system check information with the system state determination standard information set by the user to determine an operating state (i.e., system state) of the device to be controlled 400. As the system state determination standard information, all or some pieces of the user setup information may be used. For example, in the case of a self-driving car, information on a driving route to a destination, a maximum allowable error when departing from the driving route, a maximum driving speed, an acceleration rate, a deceleration rate, a vehicle interval, etc. may be the user setup information, and it is possible to use only the driving route information and the maximum allowable error among the above information as the system state determination standard information. In this case, the current location and driving route information included in the system state information are compared, and when the current location of the car is within the maximum allowable error and is on the driving route, it is determined that a state of the car is within a normal range, and when the current location of the car is out of the allowable error, it is determined that the state of the car is out of the normal range.

S110: When the security computing unit 200 determines that the system state is within the normal range in the system state determining operation S100, the preliminary control information generated by the user computing unit 100 is transmitted to the control input/output unit 300 as final control information.

S120: Accordingly, the device to be controlled 400 receives the final control information and performs an operation corresponding thereto.

S130: Meanwhile, when the security computing unit 200 determines that the system state is out of the normal range in the system state determining operation S100, a security action (e.g., security action program) preset by the user (S30) is taken.

The security action preset by the user may be a series of control programs or a combination of single pieces of control information. The security action may be initiated automatically or manually.

The security action is to command the user computing unit 100 to attempt restoration for a certain period of time in order to restore the user computing unit 100, but may be to restore and reset (reboot) the operating system and application programs of the user computing unit 100 to an initial state according to the severity of the state information. This may be implemented by applying a hardware reset signal or a non-maskable interrupt (NMI) signal to the user computing unit 100.

When the operation result of the user computing unit 100 is restricted from being reflected in the actual output due to the security action and the user computing unit 100 is restored to the normal state, whether to allow the user computing unit 100 to output again may be determined by user settings.

Further, the security action may be taken automatically or manually step by step by reflecting information provided by a third-party control system or controller (committee) connected through a communication network.

When the security action is taken, a visual, audible, or haptic alarm may be provided to the user (operator) or manager (supervisor) of the system to inform the user (operator) or manager (supervisor) of the automatic initiation of the security action or the security action program may be driven so that the user (operator) or manager (supervisor) can manually take the security action. In this case, a new security action program may be downloaded to the security computing unit, and various ways may be provided so that the security action may be taken.

Figure 4:
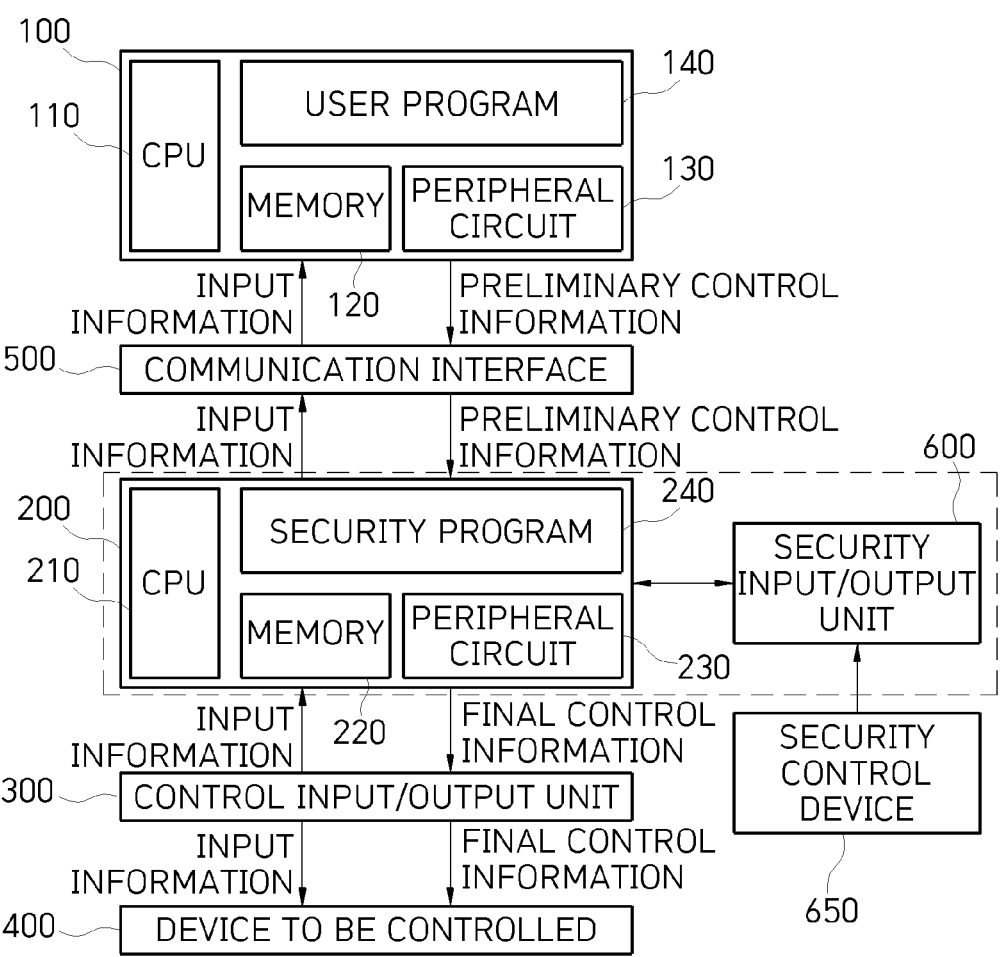
FIG. 4 is a configuration diagram of a modified embodiment of the control system illustrated in FIG. 2.

FIG. 4 is a configuration diagram of a modified embodiment of the control system illustrated in FIG. 2.

The security input/output unit 600 is included in or connected to the security computing unit 200. The security input/output unit 600 may be configured to process physical input/output signals, and in this case, the security input/output unit 600 may be configured to perform the same function as a digital input/output module or an analog input/output module of a PLC. Further, the security input/output unit 600 may be formed of a data communication device and connected to a communication port of a security control device 650. In this case, it is possible for a third party or institution entrusted with control authority in an emergency to control the entire system by a state of the entire system being reported to the third party or institution using the security input/output unit 600, or by issuing commands to the security computing unit 200 using the security control device 650 and downloading programs for emergency response.

The user computing unit 100 cannot use the security input/output unit 600. For example, in the case of a self-driving car, when a security situation occurs due to departing from the route, the security computing unit 200 may execute a corresponding security action program to safely move the car to the roadside and park the car, and then notify the police or another related person using the security input/output unit 600.

Assuming that the control system of the present invention having the above configuration and functions had been applied to the control system of the 9/11 terrorist airplane, the security computing unit 200 of the present invention may have calculated that the airplane was rapidly descending by integrating flight information (altitude, direction, condition of wings, wind speed, radar information, etc.) and various types of information (engine power, condition of wings, position of steering wheel, etc.) capable of grasping the pilot's intention. In addition, by analyzing input/output information including the position of the steering wheel, it could have been calculated that the airplane would collide with the building ahead after some period of time. Further, it could have been recognized that the airplane could fly without colliding with the building only if the control input including the steering wheel were changed from the current state. In this case, the security computing unit 200 may have recognized immediately that there was a problem with the user computing unit 100 or the pilot, ignored the pilot's control input, and maintained the flight's state or executed an automatic emergency landing under the ground control according to a preset security action program. The above content may also be applied when a pilot has an accident (or is absent).

Further, looking back at the case of the disappearance of the Malaysian aircraft, it is difficult to determine a pilot's intention only by deviating the aircraft from the route because it is likely that the aircraft deviated from a preset route to some extent during aircraft operation. However, if the present invention had been applied, the security computing unit 200 may have reviewed a period of time or degree of deviation from the route, reported the period of time or degree of deviation to the control center, removed the pilot according to the control center's control, returned the airplane to the route, and waited for a next command or made an automatic emergency landing. That is, the security computing unit 200 may have analyzed real-time navigation data of the pilot corresponding to the user computing unit 100 so that the abnormal situations could be detected and controlled.

Further, in the case of a car, due to hacking or abnormal operation of AI (autonomous driving function), the car may operate differently from the intention of an occupant. In the conventional computing architecture with one CPU, AI itself was a good-intentioned controller, and thus it was difficult to correct the different operation. Such a problem is equally problematic in the trust zone security technology adopted in the advanced reduced instruction set computer machine (ARM) series CPU. The trust zone security technology prevents non-trust zone processes from accessing resources located in the trust zone (unless there is a separate part that controls input/output as in the present invention), but system designers cannot prevent abnormal unintended operations by only protecting the trust zone resources. However, when the present invention is used, since the user computing unit 100 has an isolated structure, it is possible for the security computing unit 200 to notify passengers, operators, or the control center of abnormalities in the operation (execution results and outputs) of the user computing unit 100, and stop or continue driving under the control of the passengers or the control center. For example, assuming that a control system of a self-driving car using AI is hacked, after the hacking, the control system may transmit the conversation inside the car to a hacker, change the route and drive, or even completely deviate from the route and cause the car to fall under a bridge.

However, when the control system having the isolated user computing unit 100 of the present invention is applied, since the security computing unit 200 manages the input and output device even when an attempt is made to transmit conversation content by hacking, the occupant may be notified of transmission attempts and the transmission attempts may be stopped.

In addition, even in the case of causing the car to deviate from the route and collide with another car or facility or fall under a bridge, the security computing unit 200 may prevent a sudden change of direction in consideration of driving information (speed, alignment of wheels, road conditions, engine output state, steering wheel position, etc.) of the car and a minimum safe distance set by the user, thereby protecting the car and occupants from hacker attacks.

Furthermore, even when the user computing unit 100 becomes abnormal due to hacker attacks or AI malfunction and the aircraft or car stops, the user computing unit 100 in the present system may be initialized or restored normally in such a way that the security computing unit 200 resets the user computing unit 100.

Hereinafter, specific examples to which the present invention is applied will be introduced.

Example 1: Self-Driving Car

Generally, a self-driving car is composed of a steering device, a driving device (including an engine/motor and a braking device), a self-driving computer (including electronic control unit (ECU)), a Global Positioning System (GPS), an imaging device, a radar, a driver interface, and the like. Further, the steering device, the driving device, the GPS, the imaging device, the radar, and the driver interface may generally all be directly connected to an input device and an output device of the self-driving computer. Therefore, the self-driving computer outputs appropriate control signals (control information) to the steering device and the driving device using information (input information) provided by the GPS, radar, etc., and the self-driving car travels along a route set by a user.

According to the present embodiment, the self-driving computer is composed of the control input/output unit 300, the security computing unit 200, the communication interface 500, and the user computing unit 100 of the control system according to the present invention, and the steering device, the driving device, the GPS, the imaging device, the radar, the driver interface, and the like are the devices to be controlled 400. Meanwhile, the security input/output unit 600 and the security control device 650 may be selectively connected. Therefore, the AI program responsible for autonomous driving is executed as a user program in the user computing unit 100, a security program is executed in the security computing unit 200, and the steering device, the driving device, the GPS, the imaging device, the radar, and the driver interface are connected to the control input/output unit 300. That is, the user computing unit 100 is connected to the control input/output unit 300 through the security computing unit 200. In some cases, a portion of the control input/output unit 300 may be exclusively used by the security computing unit 200.

Now, it is assumed that a driver has set a destination and set a route through the driver interface. Further, it is assumed that the driver has set information for security control and a security action (security program) to "immediately stop on the roadside" in the security control module of the security computing unit 200 when the driver deviates 100 m or more from the route.

An autonomous driving AI program, which is executed in the user computing unit 100 until the car departs and reaches the destination, reads information (input information) from various types of devices of the car using input and output units, executes an autonomous driving algorithm, and generates and outputs a signal (control information) for operating the device to be controlled to control the car.

Meanwhile, the security computing unit 200 of the self-driving computer reads information from the control input/output unit 300 and outputs the information to the control input/output unit 300 according to a request of the user computing unit 100. In most cases, the read information is provided to the user computing unit 100, and the information (preliminary control information) output by the user computing unit 100 is checked by the security program and then transmitted to the control input/output unit 300. To this end, first, the input information providing operation S60 in which the security computing unit 200 provides input information of an input device connected to various types of devices of the car to the user computing unit 100 is performed. In this case, the current state information of the steering device and the driving device of the car, the GPS position information, lane and vehicle/obstacle information provided as front and rear images or a result of image analysis, distance and location information of front obstacles provided from the radar, driver input information received from the driver interface, etc. are transmitted to the autonomous driving AI program running on the user computing unit 100.

Next, the preliminary control information receiving operation S80 in which the security computing unit 200 receives the preliminary control information from the user computing unit 100 is performed. In this case, the preliminary control information is generated by executing an autonomous driving algorithm on the basis of the input information of the autonomous driving AI program of the user computing unit 100, and the preliminary control information includes steering device and driving device control information, GPS control information, imaging device control information, radar control information, user interface control information, and the like.

Next, the system check information deriving operation S90 in which the security computing unit 200 derives the system check information using the preliminary control information, the input information, and the user setup information is performed. In this operation, the user setup information is route information to the destination. In addition, in order to determine whether the car is driving according to the route, the current location information of the car read from the GPS is required, and thus the system check information is based on the route information and the current location information.

Subsequently, the system state determining operation S100 in which the system check information is compared with the system state determination standard information set by the user is performed. In this operation, the system state determination standard information set by the user is "off the route by 100 m or more," and thus the route information and the current location information are compared to check whether there is a difference of 100 m or more.

Finally, when it is determined that the system state is within a normal range in the system state determining operation, the final control information is output to the control input/output unit 300 (S110), and the security control operation S130 is performed in which, when it is determined that the system state is not within the normal range, the security action preset by the user is taken. In the present embodiment, when the current location of the car is within 100 m of the route, it is determined that the state of the car is within the normal range, and the preliminary control information generated by the user computing unit 100 is transmitted to various types of devices to be controlled of the car as the final control information.

However, when the current location of the car differs by 100 m or more from the route, a security action program for security action is executed. Since the security action is "to immediately stop the car on the roadside," the security computing unit 200 displays "departed from the route and stopped" on the driver interface, and performs the security action executing operation by referring to the current state information of the steering device and the driving device of the vehicle, the GPS position information, the lane and vehicle/obstacle information provided as front and rear images or a result of image analysis, the distance and location information of front obstacles provided from the radar, etc. In this process, when the security action program is executed, the steering device and the driving device control information, the GPS control information, the imaging device control information, the radar control information, and the user interface control information are generated, and thus the security computing unit 200 provides this information to the control input/output unit 300 to control the car.

Once the security action is taken, the security computing unit 200 controls the car until the security action is completed regardless of the operation of the user computing unit

100. In the present embodiment, nearby cars and obstacles are analyzed in real time, and the car is controlled until the action of moving the car to the roadside and stopping is completed. In this case, depending on the situation, the driver may issue a command to stop the security action to the security computing unit 200 using the driver interface.

In the present embodiment, a "security action is taken to immediately stop the car on the roadside when there is a difference of 100 m or more between the route and the current location of the car," is performed, and as another example, "receiving the driver's instructions through the driver interface when the route and the current location of the car differ by 100 m or more," may be performed as the security action. In this case, the security computing unit 200 outputs control information (i.e., preliminary control information) generated by the user computing unit 100 to various types of devices of the car to inform the driver that the car has deviated from the route by 100 m or more through the user interface in a state where the steering of the car is left to the user computing unit 100, and receives instructions from the driver.

Although the above-described autonomous driving algorithm program and security control program may be executed simultaneously even in a general self-driving computer having a single CPU, in the self-driving computer having a single CPU, when the autonomous driving algorithm runs out of control, there is always a possibility that the security control program being unable to be executed or being executed slowly, and causing an accident. In contrast, in the control system according to the present invention, when the car deviates from the route due to a congestion phenomenon such as a malfunction of the user computing unit 100 or an abnormal autonomous driving algorithm, the security computing unit 200 intervenes and manages the car under the driver's control in a reliable and stable manner, and thus the possibility of an accident may be significantly reduced.

Example 2: Passenger Airplane

Generally, a passenger airplane has a flight system composed of a steering device (including wings and wheels), a driving device (including an engine and a brake device), a flight computer, a GPS, an imaging device, measurement devices (various sensors), a radar, a satellite communication device, a pilot interface, etc. In this case, it is assumed that various types of devices are connected to an input/output unit of the flight computer, and hydraulic devices that control the engine or wings are also connected via a communication network and driven electronically. Therefore, the flight computer outputs an appropriate control signal (control information) to the steering device and the driving device using the control signal of the pilot transmitted from the pilot interface and information (input information) provided by various types of devices, and controls the wings and engine to make the passenger airplane fly on a set route.

In this case, the flight computer is a control system configured according to the present invention, and is composed of the user computing unit 100 isolated from the control input/output unit 300, and the security computing unit 200 having a communication interface connected to the user computing unit 100 and a security control module (program). Therefore, a flight control program in charge of flight is executed as a user program in the user computing unit 100, a program for the security control module is executed in the security computing unit 200, and various types of devices are connected to the control input/output unit 300 as the devices to be controlled 400. Further, the user computing unit 100 is connected to the security computing unit 200 through the communication interface, and the control input/output unit 300 is connected to the security computing unit 200. In some cases, a portion of the control input/output unit 300 may be exclusively used by the security computing unit 200.

Now, it is assumed that a pilot or navigator sets a route by inputting information on a destination through the pilot interface. Further, it is assumed that a government agency in charge of aviation operations, for example, the National Transportation Safety Board (NTSB), sets information and a security action (security action program) for security control to the security control module to, "in the case of deviation of 100 km or more from a planned flight route, immediately switch to automatic navigation flight and report to the NTSB using the satellite communication device."

A flight control program, which is executed in the user computing unit 100 once the passenger airplane departs, until the airplane reaches the destination, reads information from various types of devices of the passenger airplane using the control input/output unit 300, receives the pilot's input using the pilot interface, executes a flight control algorithm, and generates and outputs signals for controlling various types of devices to actually control the passenger airplane.

Meanwhile, the security computing unit 200 of the flight computer provides the information read from the input device or outputs the information to the output device according to a request of the user computing unit 100. The security computing unit 200 provides the read information to the user computing unit 100 as the input information, and the information output by the user computing unit 100 is verified by the security program and then transmitted to the control input/output unit 300. To this end, first, the input information providing operation S60 in which the security computing unit 200 provides the input information of the input device connected to various types of devices of the airplane to the user computing unit 100 is performed. In this case, the current state information of the steering device, including the state of each wing of the airplane, the current state information of the driving device such as engines, the state information such as altitude, atmospheric pressure, wind direction, wind speed, and temperature input from the measurement device, the GPS position information, the distance and position information of the front obstacle provided from the radar, the input information of the pilot received from the pilot interface, etc. are transmitted to the flight control program running in the user computing unit 100.

Next, the preliminary control information receiving operation S80 in which the security computing unit 200 receives preliminary control information from the user computing unit 100 is performed. In this case, the preliminary control information is generated by executing the flight algorithm on the basis of the information input by the flight control program of the user computing unit 100 (S70). The preliminary control information is composed of control information on the steering device such as wings and the driving device such as an engine, measurement device control information, GPS control information, imaging device control information, radar control information, pilot interface control information, etc.

Next, the system check information deriving operation S90 in which the security control module (program) of the security computing unit 200 derives system check information using the preliminary control information, the input information, and the user setup information is performed. In this operation, the user of the security computing unit 200 is the NTSB, and the setting information is information on a route to the destination. In addition, since the current location information of the airplane read from the GPS is required to determine whether the airplane is flying according to the reported route, the system check information is composed based on the route information and the current location information.

Next, the system state determining operation S100 in which the system check information is compared with system state determination standard information set by the user is performed. In this operation, since the system state determination standard information set by the user in the security computing unit 200 is a "maximum allowed error of deviation from the flight route of 100 km," it is checked whether the flight route has a difference of 100 km or more on the basis of the route information and the current location information.

Finally, when it is determined whether the system state is within a normal range in the system state determining operation, final control information is output to the control input/output unit 300. When it is determined that the system state is not within the normal range, the security action executing operation S130 is performed in which the security action preset by the user is taken.

In the present embodiment, when the current location of the airplane is within 100 km of the route, it is determined that the airplane is within the normal range, and the preliminary control information generated by the user computing unit 100 is output to various types of devices of the airplane as final control information. However, when the current location of the airplane is 100 km or more away from the route, the security action is taken. Since the security action is "immediately switch to automatic navigation flight and report to the NTSB," the security computing unit 200 displays "departed from the route and reporting the situation to the NTSB" on the pilot interface, sets the passenger airplane to fly in automatic navigation flight mode, and reports the current state information of various types of devices of the airplane, the GPS location information, the cockpit image, and the distance and location information of front obstacles provided from the radar to the NTSB using the satellite communication device. Practically, it is desirable to implement this in such a way as to be connected to the NTSB's safety management computer through the satellite communication and transmit the current state of the airplane in real time to receive a follow-up action from the NTSB.

The NTSB may communicate with the pilot after learning the passenger airplane's state provided by the safety management computer. However, like the case of the disappearance of the Malaysian airliner, communication may not be possible when the pilot turns off both the device that transmits the location of the plane and the communication device. However, unlike such disappearance accidents, in the passenger aircraft equipped with the control system to which the present invention is applied, since the security computing unit 200 has all state information including the location information of the airplane even when the pilot turns off the device for transmitting the airplane's position, the disappearance accident may be prevented by reporting the position of the plane to the aviation safety authorities and completely excluding the pilot's intention. Furthermore, the NTSB may use the safety management computer to control the airplane like an unmanned drone and force the airplane to land at a nearby airport.

As described above, in the control system according to the present invention, a user (the NTSB in the present embodiment) of the security computing unit 200 may immediately recognize and deal with malicious operations by a user (the pilot in the present embodiment) of the user computing unit 100, and thus the airplane can be placed under the control of the aviation safety manager in a reliable and stable manner.

Although the present invention has been described in detail with reference to embodiments, it will be understood by those skilled in the art that the present invention may be implemented in a specific form different from the content disclosed herein without departing from the scope of the present invention and without changing essential features. The above-described embodiments should be considered in a descriptive sense only and not for purposes of limitation. Further, the scope of the present invention is defined not by the detailed description but by the appended claims, and encompasses all modifications or alterations derived from meanings, the scope and equivalents of the appended claims.

The invention claimed is:

1. A control system having an isolated user computing unit, comprising:
   a user computing unit including a first central processing unit (CPU) and peripheral circuits, and configured to execute a control program for controlling a device to be controlled using input information, which is input from the device to be controlled, to generate preliminary control information, the user computing unit being isolated from the device to be controlled;
   a security computing unit including a second CPU and peripheral circuits, and configured to generate system check information using the input information received from the device to be controlled, the control program, system state information, and the preliminary control information provided from the user computing unit, compare the system check information with system state determination standard information preset by a user, directly output the preliminary control information as a final control information when it is determined that an operation state of the device to be controlled is within a normal range, and take a security action preset by the user when it is determined that the operation state of the device to be controlled is out of the normal range; and
   a control input/output unit connected between the device to be controlled and the security computing unit and not connected to the user computing unit, and configured to receive the input information from the device to be controlled and to provide the input information to the user computing unit through the security computing unit, and further configured to provide the final control information outputted by the security computing unit to the device to be controlled,
   wherein the input information includes at least one of a state signal of the device to be controlled and a sensor detection signal; and the preliminary control information and the final control information include a control signal for controlling the device to be controlled, and wherein the security computing unit is configured to generate the system check information by, prior to receiving the preliminary control information provided from the user computing unit, performing calculation using the input information, the control program, and the system state information, and performing remaining calculation using the preliminary control information after the user computing unit provides the preliminary control information.

2. The control system of claim 1, wherein the security computing unit is configured to perform the remaining calculation, after the preliminary control information generated and provided by the user computing unit is compared with preliminary control information generated by the security computing unit and a result of the comparison is verified.

3. The control system of claim 1, wherein the security action is to restore or reset an operating system or application program of the user computing unit to an initial state.

4. The control system of claim 1, wherein an alarm is output when the security action is taken.

5. The control system of claim 1, further comprising a security input/output unit configured to report a state of the control system to an entity outside the control system or receive a command or computer program to be executed by the security computing unit from the entity outside the control system.

6. A control method performed in the control system having the isolated user computing unit according to claim 1, comprising:

an input information providing operation in which the input information is provided to the user computing unit through the security computing unit;

a preliminary control information receiving operation in which the security computing unit receives the preliminary control information from the user computing unit;

a system check information deriving operation in which the security computing unit derives system check information using the preliminary control information and the input information;

a system state determining operation in which the derived system check information is compared with preset system state determination information;

a final control information providing operation in which when it is determined that a system state is within a normal range in the system state determining operation, the preliminary control information is output; and a security action executing operation in which when it is determined that the system state is not within the normal range in the system state determining operation, a security control program is executed, wherein the input information includes at least one of a state signal of the device to be controlled and a sensor detection signal; and the preliminary control information and the final control information include a control signal for controlling the device to be controlled, and wherein in the system check information deriving operation, the system check information is derived by, prior to receiving the preliminary control information provided from the user computing unit, performing calculation using the input information, the control program, and the system state information, and performing remaining calculation using the preliminary control information after the user computing unit provides the preliminary control information.

7. The control method of claim 6, wherein, in the system check information deriving operation, the remaining calculation is performed using the preliminary control information, after the preliminary control information generated and provided by the user computing unit is compared with preliminary control information generated by the security computing unit and a result of the comparison is verified.

8. The control method of claim 6, wherein the security action executing operation includes:

a security information providing operation in which at least one of the system check information, the system state information, the input information, and the final control information is provided to an entity outside the control system; and a security command applying operation in which a security command is issued to the security computing unit on the basis of information provided from the entity outside the control system.

9. The control method of claim 6, wherein, the preliminary control information receiving operation, the system check information deriving operation, the system state determining operation, the final control information providing operation, and the security action executing operation are performed whenever the input information is provided to the user computing unit through the security computing unit in the input information providing operation.

10. The control method of claim 6, wherein the preliminary control information receiving operation, the system check information deriving operation, the system state determining operation, the final control information providing operation, and the security action executing operation are performed after the input information is provided to the user computing unit through the security computing unit a predetermined number of times in the input information providing operation.

* * * * *